INVENTOR.
ANTHONY J. SURACI
Cushman, Darby & Cushman
ATTORNEYS

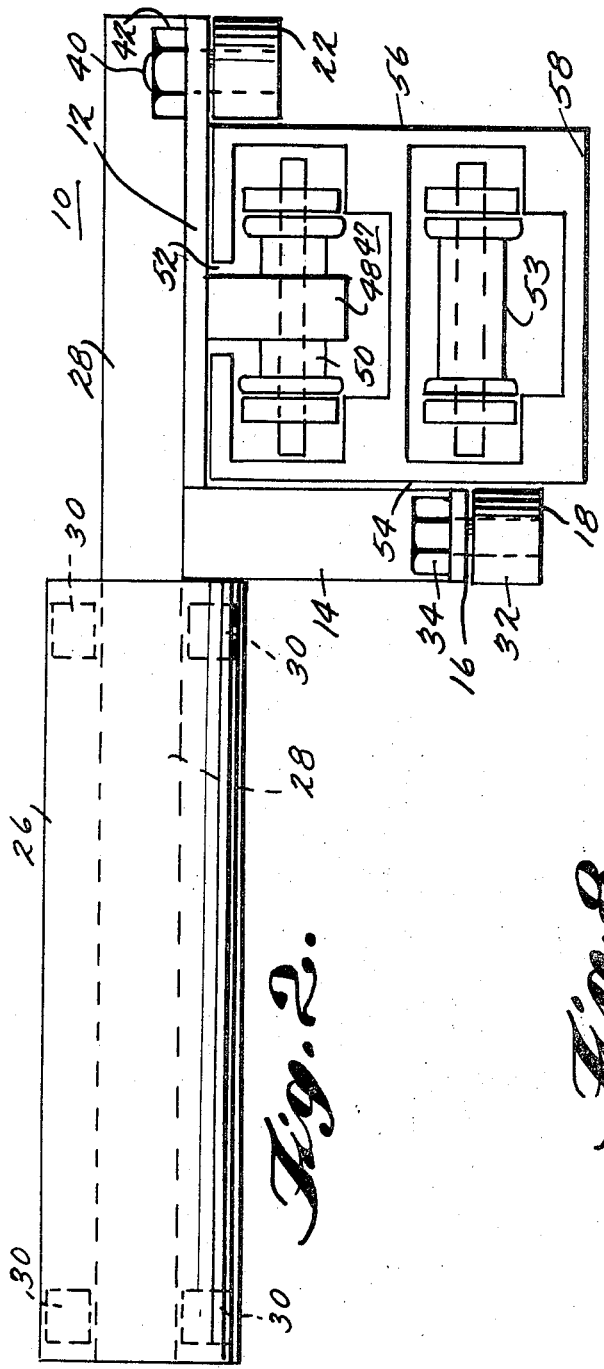
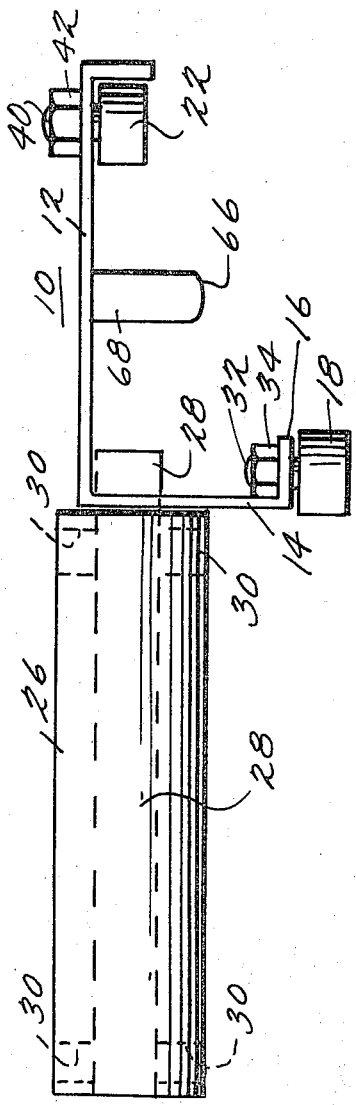

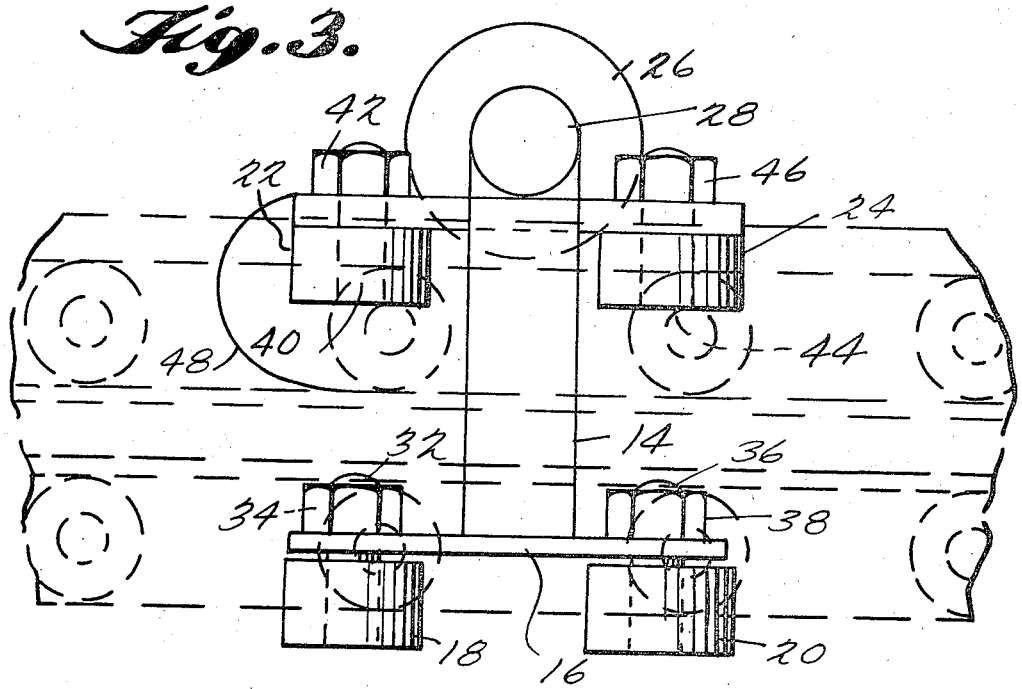
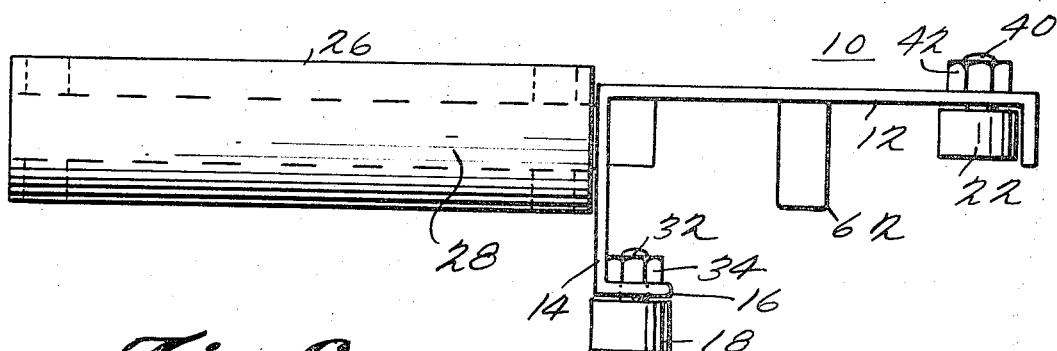
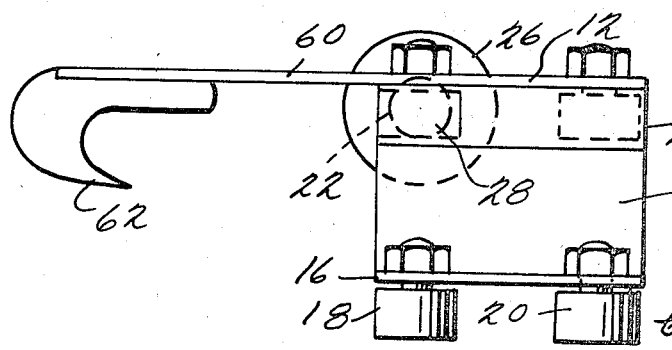

Jan. 28, 1969     A. J. SURACI     3,424,103
CLIP-ON PUSH ROLLER

Filed Oct. 27, 1966     Sheet 4 of 4

INVENTOR.
ANTHONY J. SURACI
BY
Cushman, Darby & Cushman
ATTORNEYS

United States Patent Office 3,424,103
Patented Jan. 28, 1969

3,424,103
CLIP-ON PUSH ROLLER
Anthony J. Suraci, Mobile, Ala., assignor to Jet Automatic Car Wash Equipment Company, Inc., Mobile, Ala., a corporation of Alabama
Filed Oct. 27, 1966, Ser. No. 589,913
U.S. Cl. 104—172
Int. Cl. B61b *13/00;* B61c *11/00;* B65g *19/24*
14 Claims

ABSTRACT OF THE DISCLOSURE

A clip-on push roller is adapted to be utilized with a conventional chain conveyor assembly having a housing with two vertical side walls and a longitudinal opening in the top wall. The clip-on push roller comprises a frame having spaced apart stabilizing members for engaging the outer surfaces of the side walls of the conveyor housing, a hook for engaging the conveyor chain which extends through the longitudinal opening in the housing, and a push roller rotatably mounted on a shaft of the frame. The clip-on push roller can also be utilized with conveyor assemblies having the longitudinal opening of the conveyor disposed in one or both sides of the conveyor assembly.

---

This invention relates in general to apparatus for moving objects with the aid of moving conveyor means such as a chain or the like; and in particular, this invention relates to apparatus for moving heavy objects such as automobiles with the aid of moving conveyor means such as an endless chain disposed at the side of or underneath the automobile.

Further, in particular, this invention relates to apparatus for moving automobiles through car wash establishments or parking lots, the apparatus being removably connected to a conveyor means such as a chain and adapted to push the automobile to a desired location.

Presently, there are available single and double chain conveyors with permanently attached push rollers used to move or propel an automobile along the production line of an automatic car wash.

Futrher, there are single chain conveyors without rollers which employ a drag chain with a variety of hooks at both ends. One end is manually hooked onto the car itself and the other end onto the conveyor chain.

Another prior art method is to push against the back of an automobile with a bar, the bar having a hook which connects onto the conveyor chain.

Conveyors with push rollers having the roller permanently attached to the conveyor chain must have a special return housing at additional expense and maintenance. Further, because of the design of permanently attached push rollers, the volume of production in automatic car washes is reduced because of the fixed spacing of the permanently attached rollers along the length of the conveyor chain. For example, if an automobile is not timed to enter the production line at the correct time, is must then wait for the next roller to push the car forward, leaving a blank space on the production line. Further, the permanently attached roller is capable of pushing against only the front wheel of the automobile without the risk of damage to the underside of the automobile. In addition, with permanently attached rollers, repair of the rollers or alignment thereof caused by ordinary wear cannot be made unless the entire system is stopped.

Thus, it is the primary purpose of this invention to avoid the above-mentioned disadvantages of permanently attached push rollers while at the same time avoiding the disadvantages of drag chains which substantially increase the danger of damaging the automobile, among other things.

It is another object of this invention to provide improved apparatus which may be removably connected to a conveyor chain at will and where desired in an automatic car wash. It is a further object of this invention to provide improved apparatus for moving automobiles in an automatic car wash, the apparatus including a push roller which is removably connected at will to a conveyor chain and which engages the back or front wheel of an automobile and pushes the entire automobile forward.

It is another object of this invention to provide improved apparatus removing heavy objects such as automobiles with the aid of moving conveying means disposed at the side or beneath the automobile.

It is another object of this invention to provide improved apparatus for moving automobiles through an automatic car wash or parking lot, the apparatus being easily attached or detached to an endless conveyor chain.

It is a further object of this invention to provide improved apparatus for moving an automobile through a car wash or a parking lot whereby the number of employees necessary for moving cars is reduced.

It is a further object of this invention to provide improved apparatus for moving an automobile through an automatic car wash or parking lot whereby personnel safety is improved as compared to the front-of-car hookup method of the prior art.

It is a further object of this invention to provide improved apparatus for moving an automobile through an automatic car wash whereby the car can be driven on or off the production line or any portion thereof before attaching or detaching the apparatus from an endless conveyor chain.

It is a further object of this invention to provide improved apparatus for moving an automobile through an automatic car wash or parking lot, the possibility of damage to the car being effectively eliminated as compared to the draghook method of the prior art.

It is a further object of this invention to provide improved apparatus for moving an automobile through an automatic car wash wherein defective, damaged, or worn apparatus may be repaired or replaced without production slow down or shut down.

It is a further object of this invention to provide improved apparatus for moving automobiles through an automatic car wash or parking lot wherein maximum production volume, low initial cost, and low maintenance cost are attained.

Other objects and advantages of this invention will become apparent upon reading the appended claims in conjunction with the following detailed description and the attached drawings, in which:

FIGURE 2 is a front elevation of the embodiment shown in FIGURE 1;

FIGURE 3 is a side elevation of the embodiment shown in FIGURE 1;

FIGURE 5 is a front elevation of embodiment shown in FIGURE 4;

FIGURE 6 is a side elevation of the embodiment shown in FIGURE 4;

FIGURE 8 is a front elevation of the embodiment shown in FIGURE 7; and

Figure 1:
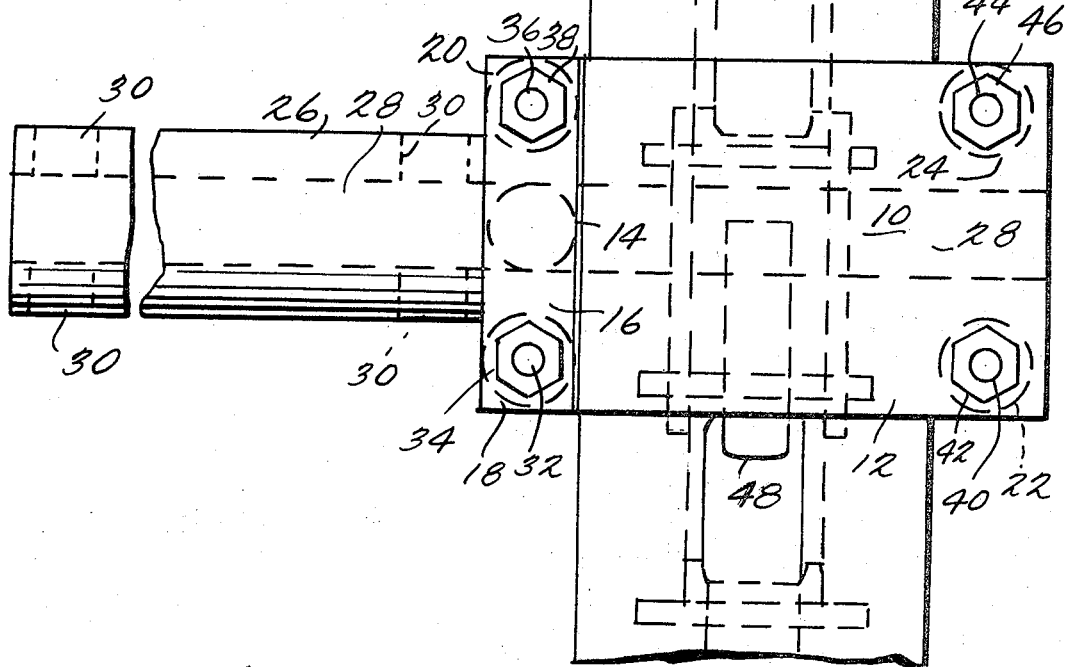
FIGURE 1 is a top plan view of a first illustrative embodiment of the invention.

Refer to FIGURES 1, 2, and 3 which, respectively, illustrate a top plan view, front elevation, and side elevation of a first illustrative embodiment of the invention.

There is provided a frame 10 which includes a horizontally extending member or plate 12 together with a first vertically extending member 14 and a second horizontally extending member 16, as shown in FIGURES 2 and 3. Attached to horizontally extending member 16 is a first pair of stabilizing members or wheels 18 and 20 as shown in FIGURE 3. Connected to horizontally extending member 12 is a pair of further stabilizing members or wheels 22 and 24.

Also connected to the frame 12 is a push roller 26, the roller being rotatably mounted about a horizontally extending shaft 28 which is connected to or may be integral with the frame 12. Bearings 30 facilitate the rotation of and the alignment with the push roller 26 with the shaft 28.

The wheels 18 through 24 are each adapted for rotation about a vertically extending axis. For instance, wheel 18 is mounted on shaft 32, this shaft being threaded at the opposite end thereof to factilitate connection to the horizontally extending member 16 of frame 10 by means of an appropriate nut or other securing means 34. The wheels 20, 22, and 24 are connected to the frame 10 in a similar manner by shafts 36, 40 and 44 and nuts 38, 42, and 46, as shown in FIGURE 3. The wheels 18 through 24 may be connected to the shafts 32, 36, 40, and 44 by any suitable means known to those skilled in this art. Other means for connecting the wheels 18 through 24 to the frame 10 will also be apparent to those skilled in this art. Further, wheels 18 through 24, with or without bearings, are contemplated. Also skids or slide bars may be used in the place of these wheels.

A hook 48 is swivelly connected to plate 12, or integrally connected thereto, as shown in FIGURE 3. The purpose of this hook is to connect the frame 10 together with the attachments thereto to a moving conveyor means such as a conveyor chain which will now be described.

As shown in FIGURE 2, the moving conveyor means includes a conventional chain conveyor denoted by chain link 50 which moves in the forward direction and chain link 53 which moves in the return direction. The conveyor means also includes a housing which has an open top 52 and two vertical side walls 54 and 56. The conveyor means including the housing is shown in dotted form in FIGURES 1 and 3 to emphasize that this does not form a part of the invention. However, the invention is adapted to operate with this type of conveyor means, which is typically employed in automatic car wash establishments.

As can be seen in FIGURE 2, the wheels 18 and 20 are adapted for moving or rolling contact with the vertical wall 54 of the housing 12 while the wheels 22 and 24 are adapted for moving or rolling contact with the vertical wall 56 of the conveyor housing. Further, the wheels 18 and 20 are preferably disposed in a common horizontal plane as can be seen from FIGURE 3. Also, the wheels 22 and 24 are preferably disposed in another common horizontal plane.

Referring to FIGURE 2 it can be seen that wheels 22 and 24 are preferably at a greater vertical distance above the bottom 58 of the conveyor means 47 than are the wheels 18 and 20. Thus, any downward thrust applied from the load or automobile to the roller 26 is compensated for and overcome. Further, the greater the distance between the upper set of wheels 22 and 24 and the lower set of wheels 18 and 20, the greater the compensation of the downward thrust. Hence, wheels 22 and 24 are disposed substantially at the top of the wall 56 while the wheels 18 and 20 are disposed substantially at the bottom of the wall 54, as shown in FIGURE 2.

Referring to FIGURE 3, note that the wheels 18 and 22 are preferably disposed in common vertical plane. Further, the wheels 20 and 24 are disposed in a second common vertical plane. The greater the distance between these two common vertical planes, the greater the compensation provided for any backward thrust applied from the load to the roller 26. Thus, the roller remains substantially perpendicular to the conveyor means 47.

Compensation for the backward thrust may also be provided by placing the hook 48 a substantial distance in the direction of travel of the conveyor chain from the vertical plane including wheels 18 and 22. As can be appreciated from FIGURE 1, the hook 48 is substantially disposed in the vertical plane that includes wheels 18 and 22. Thus, the first illustrative embodiment of this invention relies essentially on the spacing between the wheels 22 and 24 and the wheels 18 and 20 to overcome the backward thrust. However, as will be brought out in the next two embodiments of the invention, the placement of the hook 48 can also be used advantageously to overcome the backward thrust of the load.

Figure 4:
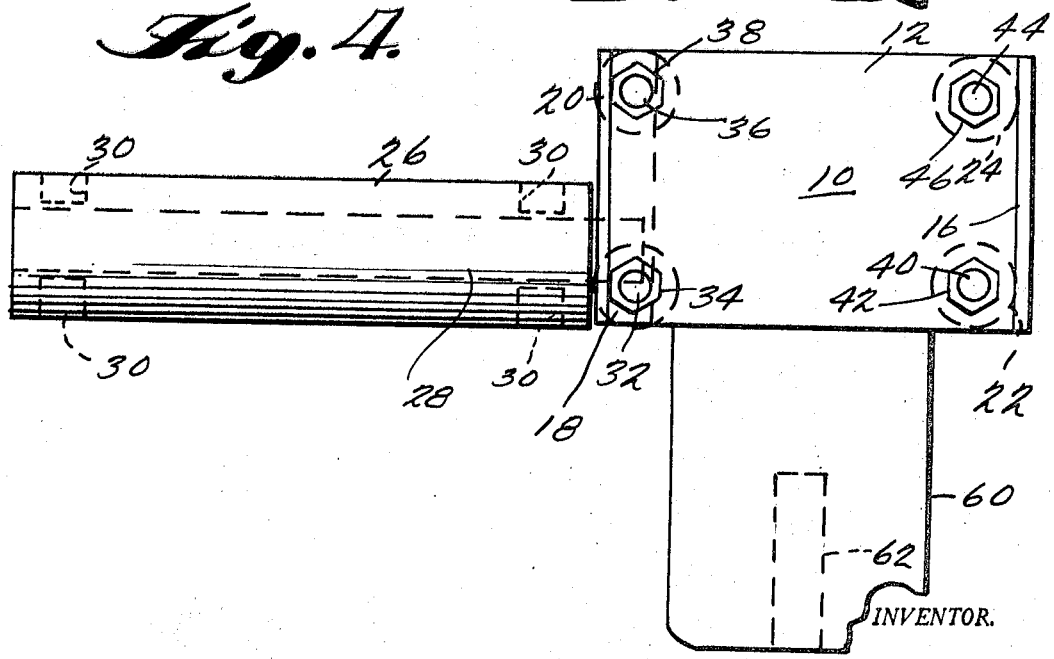
FIGURE 4 is a top plan view of a second illustrative embodiment of the invention.

Reference should now be made to FIGURES 4, 5, and 6 which, respectively, show a top plane view, front elevation and side elevation of the second illustrative embodiment of the invention.

As shown in FIGURE 5, the frame 10 includes a horizontally extending plate 12 together with vertically extending plate 14 with horizontally extending portion 16. Common reference numerals will be employed throughout all figures of the drawing whenever the structure and function of the element referred to does not substantially change from figure to figure. Further, only those structural and functional differences which distinguish one embodiment of the invention over another will be discussed in detail.

Connected to the horizontally extending plate 12 is a further forwardly extending plate 60 with a hook 62 connected thereto. Thus, as mentioned hereinbefore, the distance of the hook 62 from the vertical plane incorporating wheels 18 and 22 is advantageously employed to help overcome or compensate the backward thrust of the load of the push roll 26. This compensation action is further aided by the distance of the wheels 18 and 20 and the distance of the wheels 22 and 24, as described hereinbefore. Further, the alignment of the shaft 28 with the center of gravity of the frame 10, the plate 60 and the hook 62 further aids in the compensation of the backward thrust by permitting the wheels 20–24 to exert full action on the side walls 54 and 56. That is, the axis of the shaft 28 approximately lies in a vertical plane which also passes through the center of gravity of the apparatus consisting of the frame 10 together with the frame 60, hook 62, and wheels 18 through 24.

Figure 7:
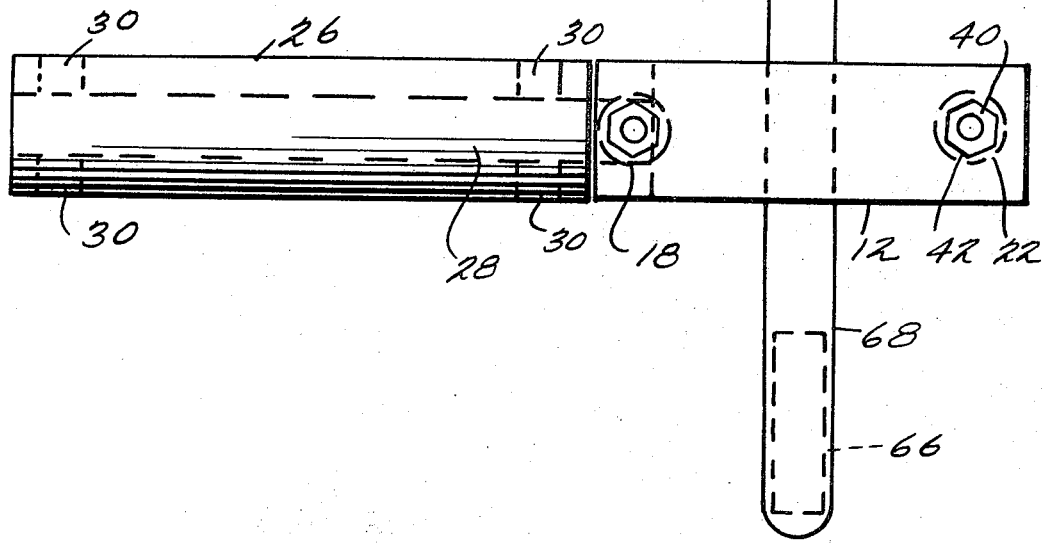
FIGURE 7 is a top plan view of a third illustrative embodiment of the invention.
Figure 9:
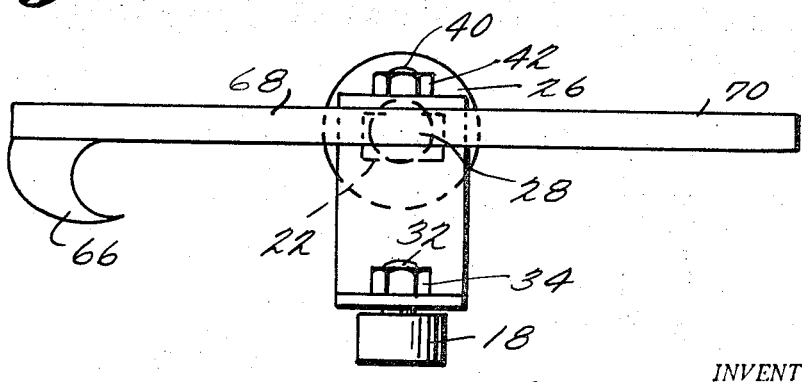
FIGURE 9 is a side elevation of the embodiment shown in FIGURE 7.

Referring now to FIGURES 7, 8, and 9, there are respectively shown a top plan view, front elevation, and side elevation of a third illustrative embodiment of the invention. In this embodiment, the amount of separation of the position of the hook from the vertical plane incorporating wheels 18 and 22 is the only factor present in overcoming the backward thrust of the load upon the push roller 26. This results from the fact that only wheels 18 and 22 are present, wheels 20 and 24 of FIGURES 1 through 6 having been eliminated. The hook 66 is connected to the frame 12 by a horizontally extending projection 68. Projection 68 also includes a portion 70 which extends behind the horizontal plate of frame 10. The purpose of portion 70 is to counterbalance the weight of the projection 68 together with the hook 66. Thus, any tendency for the projection 68 to deviate from a substantially horizontal plane is corrected by the counterbalancing portion 70.

Shaft 28 as shown in FIGURE 7 is approximately aligned with the vertical plane which passes through the center of gravity of the device, thereby aiding in the compensation of the backward thrust of the load on the roller 26.

As in the previous embodiments of the invention, downward thrust on the apparatus is overcome by the difference in vertical height of the wheels 18 and 22, as shown in FIGURE 8. Prevention of backward rotation of the frame is accomplished by the hook being engaged in front of and underneath the conveyor chain link to which it is hooked.

There has now been described in detail three illustrative embodiments of the invention which perform the objects and attain the advantages claimed therefor. The apparatus described hereinbefore can be used on any existing car wash conveyor in which the conveyor chain is housed inside a guide assembly, as shown in FIGURES 1 through 3. Also it may be used on any conveyor chain without a guide assembly by merely installing a single rail or vertical side wall on one side of the conveyor chain. In such an instance the need for the upper wheels 22 and 24 is obivated. Thus only the wheels 18 and 20 would be employed to resist the downward thrust of the load on the push roller 26, the wheels 18 and 20 being mounted for engagement with the single side wall on one side of the conveyor chain. The distance in the direction of movement of the conveyor means between (1) the wheels 18 and 20 and (2) the hook should be sufficient to overcome any backward thrust developed by the load. Further, the vertical distance of the wheels from the top of the vertical side wall should be sufficient to overcome the downward thrust developed by the load. Further, the apparatus of this invention may be used on systems which incorporate permanently attached push rollers by simply removing the permanently attached rollers on either the vertical chain, the horizontal chain or the dual chain push roller.

Thus, the apparatus as described in this invention is attachable to any car wash conveyor system. In view of the wide range of applicability of this apparatus, it may be termed a clip-on push roller for descriptive purposes.

To attach the apparatus to the conveyor chain, the operator merely grasps the push roller 26 with one hand and holds the apparatus at an angle of approximately 45° in an upward direction from the horizontal. The top wheels are hooked over the side 56 (see FIGURE 2) of the conveyor assembly and then the apparatus is lowered or dropped so that the push roller assumes a horizontal position with the hook engaging the conveyor chain as shown in FIGURES 1 through 3.

The apparatus is so constructed that it does not allow the push roller to be lowered more than the correct horizontal position necessary for the push roller. This can clearly be seen from an inspection of FIGURE 2. Inertia of the device allows the conveyor chain to come into proper contact with the hook. When the hook engages the link of the chain, the push roller moves forward into a proper contact position with the automobile tire and moves the automobile forward. The apparatus may be clipped onto the conveyor chain behind the back or front wheel of the automobile at any point along the conveyor line at any time with the conveyor means in operation or stopped.

The apparatus is removed from the conveyor when there is no load exerted against the push roller. The operator may grasp the push roller 26 by one hand. Slight pressure is forwardly and upwardly exerted thereby detaching the apparatus from the conveyor chain. The forward motion disengages the hook from the chain while the upward motion lifts the bottom wheels 18 and 20 off the conveyor assembly and provides ever increasing clearance to remove the top wheels 22 and 24 from the conveyor assembly. The pressure necessary to be exerted is only that necessary to overcome the weight of the device itself. This can be done with equal ease with the conveyor in operation or stopped and at any point along the conveyor line.

In addition to the various modifications of the invention described hereinbefore, a further important modification will now be described.

Referring to FIGURES 1 through 3, the top of the conveyor assembly is open as indicated at 52 in FIGURE 2. However, conveyor assemblies are also available wherein the opening of the conveyor assembly is disposed at one or both sides of the conveyor assembly. Thus referring to FIGURE 2, the openings would be in one or both of the side walls 54 and 56. Of course, with such an arrangement the conveyor chain would move in a horizontal plane as opposed to movement in the vertical plane, as indicated in FIGURE 2. With the chain movement in the horizontal plane, it is possible to employ the principles of this invention in a unique and novel manner. That is, the clip-on push roller assembly may be attached through the side wall openings to form a system which is equivalent to one wherein the rollers are permanently attached but where a separate housing must be provided for the return path of the rollers. Thus, in the modified system according to the invention, a plurality of removably attached push roller assemblies could be connected to the chain at regular intervals along the length thereof through openings in both side walls. The rollers would be disposed at one side of the conveyor assembly during the forward advancement of the rollers and would be at the other side of the conveyor assembly along the return path thereof. This would necessarily result in a system which performs as well as the permanently attached roller system but which is much more economical to construct and maintain.

In order to employ the three embodiments of the push roller assemblies, described hereinbefore, with a conveyor assembly wherein the conveyor chain movement is in the horizontal plane and the opening is in one or both of the side walls, a slight modification must be made to these three embodiments. Although this modification would be obvious to one having ordinary skill in this art, regardless of which embodiment of the invention is employed, a typical modification will be described in relation to the embodiment described with respect to FIGURES 1 through 3. Thus, referring to FIGURE 2, the hook 48 would be connected to the vertically extending member 14 of frame 10 rather than the horizontally extending member 12. With this simple modification, the advantages described hereinbefore are obtained.

Still numerous other modifications of the invention will become apparent to one of ordinary skill in the art upon reading the foregoing disclosure. During such a reading, it will be evident that this invention has provided unique apparatus for accomplishing the objects and advantages herein stated. Still other objects and advantages, and even further modifications will be apparent from this disclosure. It is to be understood, however, that the foregoing disclosure is to be considered exemplary and not limitative, the scope of the invention being defined by the following claims.

What is claimed is:

1. Apparatus for moving objects with the aid of moving conveyor means such as a chain or the like, said conveyor means including a housing therefor having an open top, two vertical side walls and a base, said apparatus comprising:
   a frame,
   at least one stabilizing member connected to said frame for movable contact with one of said vertical side walls of said conveyor means housing
   at least one further stabilizing member connected to said frame for movable contact with the other of said vertical side walls, the further stabilizing member being disposed at a greater vertical distance with respect to the said base of said housing than said one stabilizing member
   means connected to said frame for removably connecting said frame to said moving conveyor means, and
   means connected to said frame for contacting said object and thereby moving said object in response to the movement of said moving conveyor means.

2. Apparatus, as in claim 1, where said stabilizing member and said further stabilizing member are disposed in a common vertical plane.

3. Apparatus, as in claim 1, where said stabilizing members are wheels connected for rotation around a vertical axis, the wheels contacting the conveyor chain when the said apparatus is in operation.

4. Apparatus, as in claim 3, where said conveyor means is a chain and said means for connecting the frame to the conveyor means is a hook for connecting to one of the links of said chain.

5. Apparatus, in claim 4, where said means connected to the frame for moving the object is a roller disposed for rotation around a horizontal axis, thereby causing the movement of said object to result from a pushing action.

6. Apparatus, as in claim 5, where said frame includes a horizontal extending plate for placement over the open top of the conveyor housing and at least one vertical extending plate for mounting the said stabilizing wheels.

7. Apparatus, as in claim 1, where the said stabilizing members are slide bars.

8. Apparatus as in claim 1 where the said means for contacting the object lies substantially in the vertical plane which passes through the center of gravity of (1) the frame, (2) stabilizing member and (3) the means for connecting the frame to the conveyor means thereby aiding in the compensation of the said backward thrust.

9. Apparatus, as in claim 1, including:
   at least two of said stabilizing members for movable contact with said one side wall said two stabilizing means being disposed in the same horizontal plane,
   at least two of said further stabilizing members for movable contact with said other side wall, said two further stabilizing members being disposed in the same horizontal plane,
   the spacing between said two stabilizing members and between said two further stabilizing members being sufficient to resist the downward thrust of said object on said apparatus for moving the said object.

10. Apparatus, as in claim 9 where
    one of said stabilizing members and one of said further stabilizing members are disposed in a common vertical plane, and
    the other of said stabilizing members and the other of said further stabilizing members are disposed in a second common vertical plane.

11. Apparatus, as in claim 9, where the means for removably connecting the frame to the conveyor means is disposed a distance from the said stabilizing members sufficient to overcome the backward thrust of the said object upon the apparatus for moving the object.

12. Apparatus, as in claim 9, where said means for connecting the frame to said conveyor means is disposed at a distance from the said stabilizing members sufficient to aid in the overcoming of the backward thrust of the object upon the apparatus for moving the said object.

13. Apparatus as in claim 12 where the said means for contacting the object lies substantially in the vertical plane which passes through the center of gravity of (1) the frame, (2) stabilizing member and (3) the means for connecting the frame to the conveyor means thereby aiding in the compensation of the said backward thrust.

14. Apparatus for moving objects with the aid of moving conveyor means such as a chain or the like, said conveyor means including a housing therefor, two vertical side walls with openings in both of said side walls and a base, said apparatus comprising:
   a plurality of frames connected at regularly spaced intervals along forward and return paths of said conveyor means,
   at least one stabilizing member connected to each of said frames for movable contact with one of said vertical side walls of said conveyor means housing,
   at least one further stabilizing member connected to each of said frames for movable contact with the other of said vertical side walls, the further stabilizing member being disposed at a greater vertical distance with respect to the said base of said housing than said one stabilizing member,
   means connected to each of said frames for removably connecting each of said frames to said moving conveyor means, and
   means connected to each of said frames for contacting said object and thereby moving said object in response to the movement of said moving conveyor means.

References Cited

UNITED STATES PATENTS

| 3,022,746 | 2/1962 | Wells | 104—172 |
| 3,196,806 | 7/1965 | Brunder | 104—172 |

ARTHUR L. LA POINT, *Primary Examiner.*

D. F. WORTH, *Assistant Examiner.*